G. BEVILACQUA.
PROCESS FOR THE PRODUCTION OF CARBONATE OF LEAD.
APPLICATION FILED FEB. 16, 1915.
1,231,476.
Patented June 26, 1917.
4 SHEETS—SHEET 3.
FIG. 8.
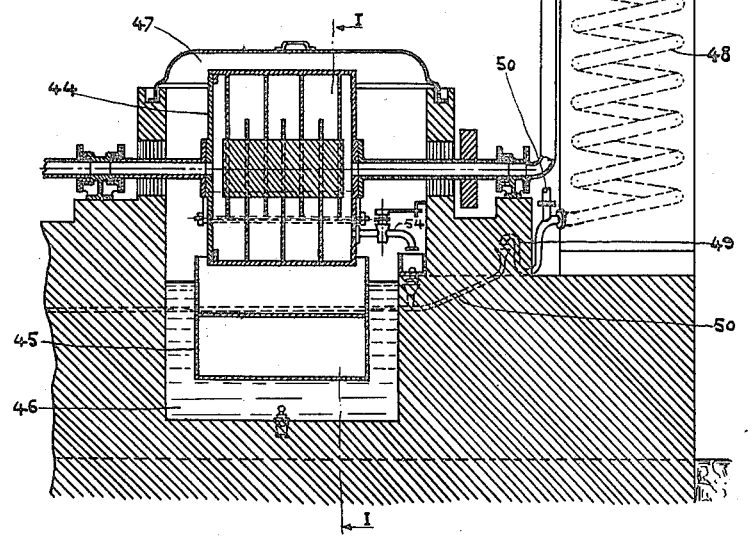
FIG. 8ª.
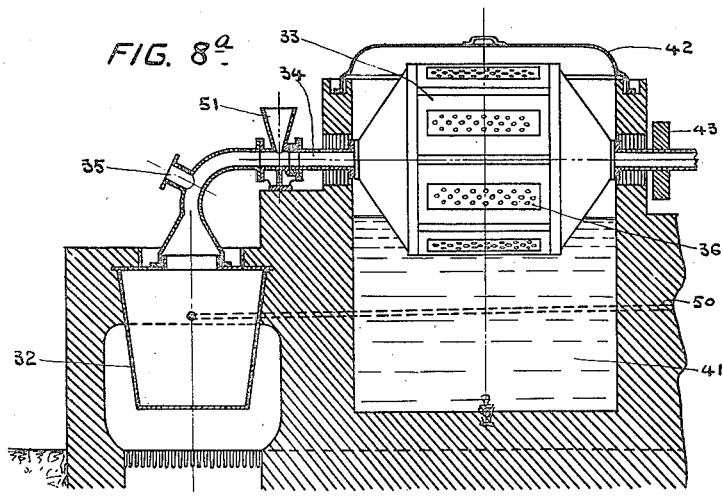
WITNESSES:
INVENTOR.
Giuseppe Bevilacqua
BY
ATTORNEYS.

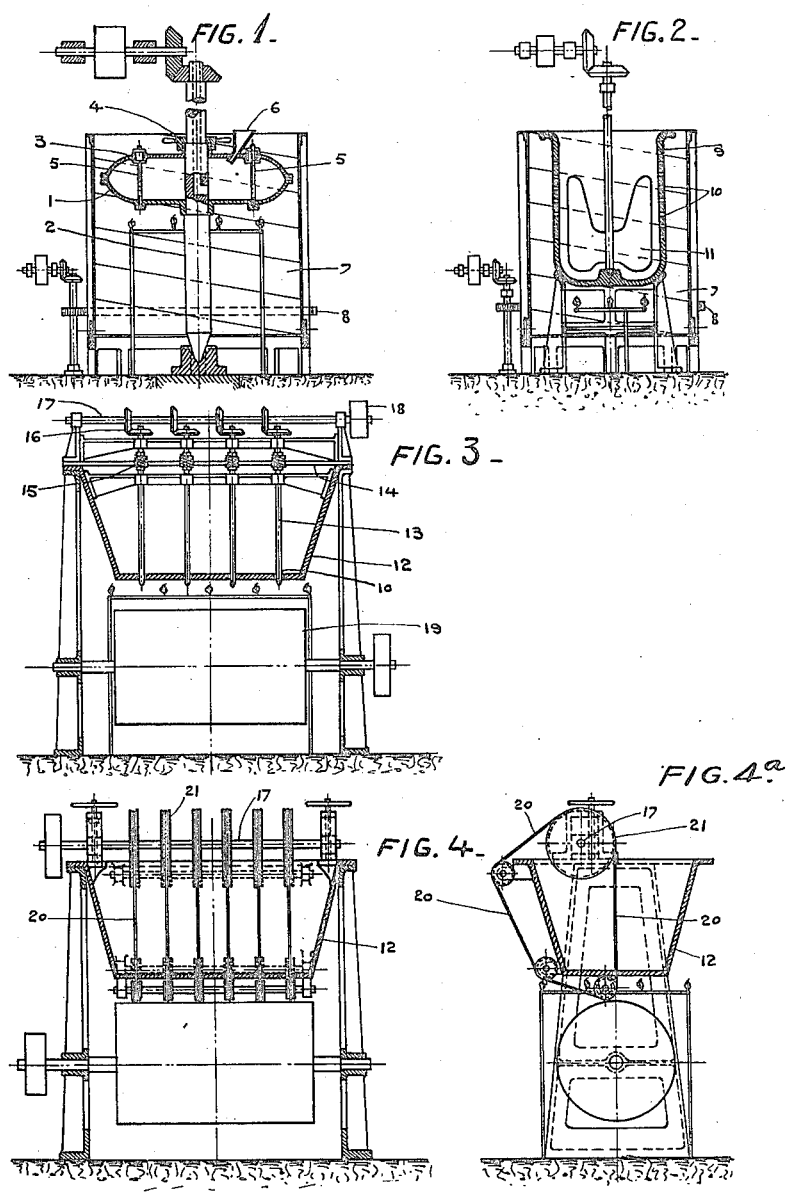

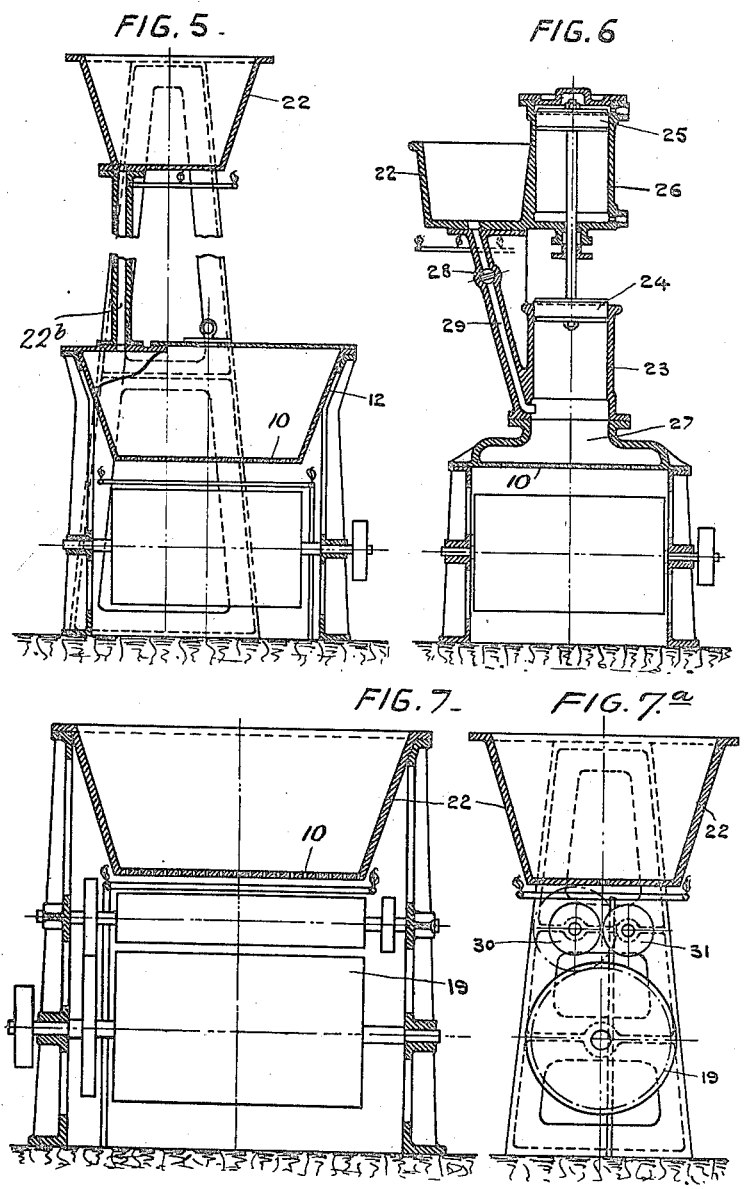

G. BEVILACQUA.
PROCESS FOR THE PRODUCTION OF CARBONATE OF LEAD.
APPLICATION FILED FEB. 16, 1915.

1,231,476.

Patented June 26, 1917.
4 SHEETS—SHEET 4.

WITNESSES:

INVENTOR.
Giuseppe Bevilacqua
BY
ATTORNEYS.

UNITED STATES PATENT OFFICE.

GIUSEPPE BEVILACQUA, OF GENOA, ITALY.

PROCESS FOR THE PRODUCTION OF CARBONATE OF LEAD.

1,231,476.  Specification of Letters Patent.  Patented June 26, 1917.

Application filed February 16, 1915. Serial No. 8,653.

*To all whom it may concern:*

Be it known that I, GIUSEPPE BEVILACQUA, a subject of the King of Italy, residing at Genoa, Italy, have invented certain new and useful Improvements in the Process for the Production of Carbonate of Lead, of which the following is a specification.

This invention relates to a new or improved process and apparatus for the production of carbonate of lead (white lead).

Several methods have been suggested for the rapid and economical production of white lead, but none of them has successfully supplanted the so-called "chamber" or "German" method, and the Dutch method, as to economy and quality of the product, since the white lead produced by these suggested methods has, as a rule, a low specific gravity and a dirty white color.

These previously suggested substitute methods, if we except the methods termed electrolytic or the methods which entirely omit the use of acetic acid, fall into three classes, as follows:—

1. Processes which make use of oxid of lead;
2. Processes which make use of lead acetate or other lead salt;
3. Processes which make use of finely divided lead. These processes offer in comparison with the Dutch method the following disadvantages:

In the first two mentioned classes of processes the action of carbonic acid on the basic lead acetate will be perceived after heating, reheating or other treatment, while in the Dutch and "chamber" processes the reagents, acetic acid, carbonic acid, water, oxygen, in a gaseous state, will attack the metallic lead simultaneously, so that as soon as the basic lead acetate is formed or is in the course of formation, it will resist the action of the carbonic acid.

With regard to the first of these classes of processes, there is also the difficulty of obtaining large quantities of oxid of lead free of minium and the oxid $PbO_2$, and thus the inconvenience of obtaining a carbonate of lead of a color inclining to gray or rosy.

Processes starting with metallic lead in a finely divided state appear well founded theoretically since the chemical reactions will take place more rapidly and completely according as the subdivision and uniformity of subdivision of the reacting bodies is greater and with regard to this, it is only necessary to consider that a difference of two or three hundredths of a millimeter in the division of the lead will cause a difference of a large number of hours in the duration of the whole operation.

In connection with these latter processes it has been previously proposed to melt the metallic lead for conversion into white lead in an ordinary melting pot from which it is run into a heated gutter containing holes located over a cooled revolving cylinder on which the drops of lead are flattened and cooled and from which they are thrown by centrifugal force into a trough containing water by which it is claimed that thin flakes result which expose a large surface to the oxidizing influence of the atmosphere. The lead flakes thus produced are converted into white lead by placing them within perforated cylinders and revolving them when partly immersed in a solution of acetate or other suitable salt of lead and exposing them in motion alternately to such solution and to the atmosphere.

According to the present invention however, I use a process and various forms of apparatus in which the lead is melted and in a state of fusion is projected against a moving surface either plane or cylindrical either by the action of centrifugal force, capillarity, disturbance, pressure, extrainment or gravity, this action producing at once, without cooling, lead laminæ the thickness of which varies according to the size of the fused lead particles the intensity and speed at which they are projected and the speed of the receiving surface, the laminæ or flakes thus produced being subsequently attacked with the ordinary reagents in a gaseous state by causing said agents to exert an influence on the lead laminæ which are contained in a perforated drum adapted to rotate in a closed chamber and partly immersed in water whereby the white lead may be removed from the water in an emulsified condition.

In the production of the lead laminæ as a rule the greater the speed of the surface the thinner will such laminæ become and in order to avoid transformations of the lead itself, which would be prejudicial to it, its course in the atmosphere and its period at a high temperature are reduced to the minimum. For this purpose it is sufficient to maintain the surface at a low temperature and at a few millimeters' distance only from the discharge orifice of the molten lead.

Should this not be sufficient or if special circumstances would not allow of this operation, it is only necessary to surround the lead issuing from the melting vessel, with an atmosphere or carbonic acid or other inert gas in excess.

Again in the treatment of the lead with the oxidizing agents the latter may be admitted through a hollow rotation shaft for the drum or in any other convenient manner.

The gases which have not been combined or have not been mechanically fixed by the white lead partly converted to a state of emulsion, will condense on contact with the cold portions of the drum surface, or will pass through the perforations in the walls of said drum, into the closed chamber, in which they will condense or will continue their way inside a second drum provided with tight walls, and arranged also in an inclosed chamber. In this case the gases will heat the walls of said drum so that it may be used for the drying of the white lead paste extracted by the precipitation and filtration of the emulsion.

To this end the paste is automatically distributed and taken away on the lateral surface of said drum, by means of a special device.

For instance a vessel located below the drum could be used, and kept at a certain distance therefrom in order that the paste inclosed therein may contact with the drum as necessary.

The rotation of said drum can be regulated to permit of the stratum of paste which it draws away, drying within a certain angular movement less than the circumference of the drum, and by means of a knife or scraper placed at the end of the course fixed, the paste may be removed as it dries, so that the drying can be continued automatically without interruption.

Most of the remaining uncondensed gas passing from the second drum (for example through the rotary shaft) will be caused to condense in a convenient cooler, and part of said gas which is not condensable will be discharged either to the chimney or by any other discharge piping. The products of condensation of the second drum and of the cooler may be transformed into active gases, and utilized again during the aforedescribed cycle of operations.

The acetic acid condensed or combined in the first drum (washing waters of the emulsion, previously set free by precipitation of the white lead that they contain), is recovered by adding said waters, in the correct proportion, to an acid brought to a boiling temperature, much higher than that of water, as for example sulfuric acid, and by introducing them where the reacting agents are generated in the gaseous state.

In the accompanying drawings are shown by way of example several forms of apparatus for the production of the lead laminæ, and construction of the several apparatus for the transformation of the lead laminæ into carbonate (white lead).

Figure 1 is a central sectional elevation of an apparatus for making lead laminæ by centrifugally throwing molten lead from a revolving receptacle against the vertical wall of a rotating cylinder.

Fig. 2 is a similar view of a modified form of apparatus in which the centrifugal force acting upon the molten lead is produced by a revolving paddle within a perforated fixed receptacle.

Fig. 3 is a sectional elevation of a different form of apparatus for making lead laminæ by allowing molten lead to run from a perforated receptacle on to a horizontal revolving drum, the holes in the bottom of said receptacle containing the ends of groove spindles.

Fig. 4 is a sectional elevation of a modified form of a machine shown in Fig. 3 in which there are wires running in the holes of the receptacle instead of the spindle.

Fig. 4ª is a sectional elevation taken at right angles to Fig. 4.

Fig. 5 is a sectional elevation of a different form of apparatus in which the molten lead is forced through apertures in the bottom of a perforated receptacle by gravity.

Fig. 6 is a sectional elevation of a different form of apparatus in which the molten lead is expelled through the apertures in a perforated receptacle by pressure produced by a plunger.

Fig. 7 is a sectional elevation of a machine having a pair of auxiliary rolls between which the lead passes before striking the main cylinder or roller.

Fig. 7ª is a sectional elevation taken at right angles to Fig. 7.

Figs. 8 and 8ª show in sectional elevation a form and arrangement of the devices for the production of the carbonate of lead starting with the lead laminæ.

Figure 9:
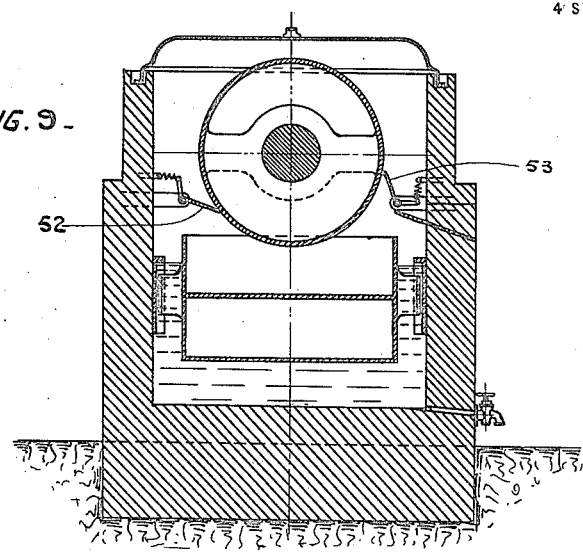

Fig. 9 is a section on line I—I of Fig. 8, viewed in the direction of the arrows.

Figure 10:
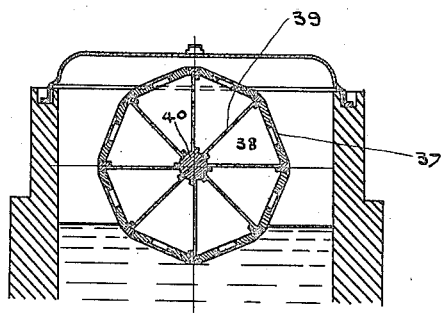
Figure 11:
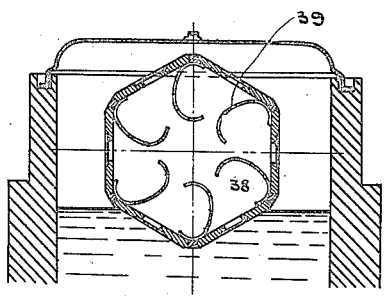

Figs. 10 and 11 show in section two other forms of construction of the drum in which the lead laminæ for the production of the white lead are contained.

Referring more particularly to the drawings,

Fig. 1 shows a centrifugal apparatus for the production of the lead laminæ, comprising two caps, of which the lower one 1 is rigidly fixed to the axle 2, and the upper one unconnected with said axle, but connected to the lower cap.

These two caps terminate in lips or projections forced together at their surfaces, but in which some apertures or grooves are provided, the caps being adapted to be drawn together and fixed by means of a central nut 4 mounted on the axle and by connecting bolts 5, so as to leave free only a small slot or passage through which the molten lead is projected to the exterior.

The charge can be inserted through the axle 2, which may be hollow, or through a lateral inlet 6 formed in the upper cap.

Outside near the discharge slot, small plates 7 can be positioned against each other to form a continuous surface, and fixed on an endless band driven by appropriate gearing 8 which imparts to said plates a rotary movement, said movement being also undulatory, descending and ascending due to the form of the supporting surface at the lower edge of the plate, whereby the lead which is projected from between the caps 1 and 3 in the form of very small drops splashes against the plates 7 and assumes the form of small laminæ.

By such an arrangement the agglomeration of the drops on the same place is avoided, and the laminæ are permitted to fall rapidly. Recourse to a detaching knife is only needed for some residue that might have been retained in the joints of the plates after long use.

In Fig. 2 the construction comprises a receptacle or vessel 9 whose walls are provided, at a certain height, with small holes 10, and internally of which works a suitable stirrer 11 which raises the molten lead from the lower part and said lead under centrifugal force passes through said holes and splashes against the external device which may be the same as in Fig. 1, and be in the form of plates.

In Fig. 3 there is shown a trough 12 having its base provided of an appropriate number of holes 10, each of which is occupied by a slightly conical metallic spindle 13, which can be provided with spiral grooves and terminates in a point, below the respective hole 10.

The spindles 13 are supported by a single support 14, and will receive reciprocating movement by means of screws or worms 15 coöperating with fixed nuts on the support and gearing 15, 16, which rotate under the action of a main shaft 17 which runs all along the trough, and is provided with a driving pulley 18.

Externally, below the set of holes 10, is a movable plane or cylindrical surface 19, kept at a suitable temperature, and against which will splash in the form of laminæ the streams or jets of molten lead which detach themselves from the points of the spindles 13.

In the construction shown in Figs. 4 and 4ª, a trough 12 is also provided and for discharging the molten lead, strong endless metallic wires 20 are provided, which are driven by a main shaft 17; this latter being provided with as many grooved pulleys 21 as there are endless wires, or also a single pulley may be used provided with as many grooves as there are wires. The wires extend through holes in the base of the trough, and it is obvious that to facilitate the sliding and prevent wear of the holes the number of pulleys can be multiplied all along the course of the wires. A thin film of lead is thus carried out of the trough by each of the wires, said film cooling as the wire moves from the lower pulley and cracks off the wire as the wire turns the lower pulley. In other respects the form of Fig. 4 is similar to Fig. 3.

In Fig. 5 the fusion vessel or trough 12 is closed at the top and is in communication with another vessel 22 placed above same by means of a pipe 22ᵇ.

In this case the pressure exerted by the molten lead column upon the lower openings in the trough allows of the elimination of any special discharge mechanism.

According to the construction shown in Fig. 6, an intermittent pressure for the generation of the lead jets in the first place and then of the laminæ is produced by means of a cylinder 23 provided with a piston 24 exactly fitted therein and driven by another movable piston 25 acting in another cylinder, placed above and co-axial with the first.

The chamber 27 provided with the holes 10 is connected to the lower cylinder by means of a convenient joint, and fusion vessel 22 placed above said cylinder is utilized for the feeding of the lead to the chamber 27, by means of a pipe 29 provided with a tap or valve 28, which remains closed during the descending strokes of the pistons and open during the ascending strokes.

In the structure shown in Figs. 7 and 7ª the molten lead in the upper vessel 22 is carried away still in heated condition by means of the rollers 30, 31 placed one near the other, said rollers being internally heated and moving in opposite directions, and then it is caused to fall upon the usual movable lower surface 19.

The apparatus or means for the conversion of the lead laminæ into white lead is shown in Figs. 8 to 11 and comprises the following essential parts:

I. A small receptacle 32 shown in Fig. 8ª for heating and adapted to resist the acids to be contained therein;

II. A rotating drum 33, in communication, by means of the hollow shaft 34, with said receptacle 32 and a pipe 35 for the carbonic acid and oxygen. The said drum is provided at the periphery with orifices 36, for example of rectangular shape closed by metallic netting 37 or by a sieve, and corresponding, each of them separately or several at a time, with internal compartments 38 terminating in sieves or metallic nettings 39 fixed on frames extending all along the drum, between a central core 40 and the periphery.

Said drum is positioned within a trough 41, provided at the upper part with a tight cover 42, and can be given the speed of rotation required by means of a convenient pulley 43 which might be fixed on the hollow shaft either previously to installing the shaft or afterward;

III. A second rotatable drum 44, shown in Figs. 8 and 9, provided with hollow axes or shafts and tight walls, is arranged in communication with the first mentioned drum. Under this drum 44 is located the floating trough 45 in which the white lead paste is contained. Said drum and trough are both inclosed in a chamber 46 closed at the upper part by a cover 47.

The drum 44 has continuous metal walls and is provided with interior webs extending transversely of the axis of the cylinder to form a tortuous passage therethrough.

The object of these webs is to lengthen the path of the residuary gases in said drum for the purpose of compelling them to give the greater part of their heat which is utilized for drying the paste. The trough 45 has a double bottom which is always empty and insures its buoyancy. The paste, in a very fluid state, is poured into said trough by means of a hopper of any convenient kind not shown and which may be for instance similar to that of 51 (hereinafter mentioned). The lead is introduced into the hopper 51 and is drawn into the drum 33 by the current of steam and gas disengaged from the receptacle 32, or by means of suction.

IV. A coiled cooler 48, is in communication with the drum 44. It can however be adapted also to the first drum 33 if required; and it is located at a convenient level with regard to the entire system and its outlet can be set in communication either with the atmosphere or with the receptacle 32, or also with the chimney or pump, by means of convenient piping 50.

The receptacle 32 is utilized for the evaporation of the usual acetic acid solution or other mixture giving off the acid at the desired degree of concentration, and through the pipe 35 for the carbonic acid also passes the necessary oxygen, previously heated.

The continuous charging of the laminated lead into the first drum 33 is effected by means of a convenient hopper 51 which discharges it into a hollow trunnion of said drum whence it is distributed upon the inner surfaces of all the moving sieves 37, in order that it may present its surface to the attack of the oxidizing gases a large number of times whereby it is converted rapidly into white lead owing to its small thickness.

The drum dips for several centimeters into the water in the trough 41, either in a continuous manner or at intervals, whereby said water passes through the sieves and the peripheral metallic nettings 37 into said drum, from which it will remove as an emulsion the white lead formed therein. Obviously, in order to facilitate this operation of emulsion, the drum can be charged with spheres or balls of convenient material.

The emulsion of white lead obtained in the trough 41 is extracted and the white lead separated from the water by known methods and finally the paste thus obtained is introduced into the floating trough 45.

The non-combining gases will pass into the drum 44 where they are utilized, as already stated, for drying the white lead paste.

Said paste is contained in the trough 45 and will contact, either continuously or at intervals, with the lower part of the drum 44. The bed or layer which is thus formed on said drum due to adhesion is reduced to the required thickness by means of a knife or other adjustable bar 52, and when dried, the paste will be detached from the drum by means of another convenient knife or the like 53.

The residue of gas which has not become condensed during this last operation, passes to the cooler 48 where it is entirely freed from the condensable constituents (acetic acid and water). The products of condensation in the drum 44 can be extracted and added separately to those of the cooler; or may be free to pursue their course in the coil itself, or discharged by means of the cock 54.

These two latter products of condensation will give a solution of acetic acid totally free from white lead, so that said solution can pass, without further operation, into the heating receptacle 32 where it will be mixed with the contents thereof, taking care always to regulate the density.

As to separation, washing and precipitation of the white lead contained in the emulsion produced in the first trough, these operations can be effected by the usual and well known methods.

Having thus described my invention, I claim:

1. A process for the production of carbonate of lead which consists in treating finely divided metallic lead with gaseous acetic acid, carbon dioxid and oxygen, and periodically washing the lead and carbonate formed thereon with water.

2. A process for the production of carbonate of lead which consists in conducting finely divided metallic lead into a perforated receptacle, acting on said lead by a mixture of gaseous acetic acid, carbon dioxid, and oxygen, forming an emulsion of the carbonate and washing the metallic lead by periodically immersing the lead in water and permitting the same to drain through said receptacle.

3. A process for the production of carbonate of lead which consists in acting on finely divided metallic lead by a mixture of gaseous acetic acid, carbon dioxid, and oxygen, removing the formed carbonate by water, and drying the carbonate by the heat in the gases not used in reacting on the metallic lead.

In testimony whereof I affix my signature in presence of two witnesses.

GIUSEPPE BEVILACQUA.

Witnesses:
 PIO RINESDINI,
 ALESSANDRO RIGHI.